United States Patent [19]

Kinoshita et al.

[11] Patent Number: 4,539,597
[45] Date of Patent: Sep. 3, 1985

[54] SOLID STATE IMAGE PICKUP DEVICE

[75] Inventors: Takao Kinoshita, Tokyo; Tokuichi Tsunekawa; Yuichi Sato, both of Kanagawa, all of Japan

[73] Assignee: Canon Kabushiki Kaisha, Japan

[21] Appl. No.: 684,978

[22] Filed: Dec. 21, 1984

Related U.S. Application Data

[63] Continuation of Ser. No. 383,248, May 28, 1982, abandoned.

[51] Int. Cl.$^3$ .............................................. H04N 3/14
[52] U.S. Cl. .................................................... 358/213
[58] Field of Search ............... 358/212, 213, 162, 166, 358/167; 357/24 LR

[56] References Cited

U.S. PATENT DOCUMENTS 4,127,877 11/1978 Morishita et al. .................. 358/213

Primary Examiner—Tommy P. Chin
Attorney, Agent, or Firm—Toren, McGeady, Stanger, Goldberg & Kiel

[57] ABSTRACT

A solid state image pickup device having a matrix array of resolution cells from which the charges are successively transferred to produce a video signal is provided with means for holding the charges for the two resolution cells adjacent to each other in a direction corresponding to the vertical scanning line for the television signal to permit the charges from the aforesaid adjacent resolution cells to be interrelated with each other. In this manner the resolving power in the vertical direction is improved.

19 Claims, 4 Drawing Figures

SOLID STATE IMAGE PICKUP DEVICE

This is a continuation of application Ser. No. 383,248 filed May 28, 1982 now abandoned.

BACKGROUND OF THE INVENTION

1. Field of the Invention

This invention relates to the structure of a solid state image pickup device, and more particularly to an interpolating method for heightening the pseudo-resolving power of the device in the vertical rows of image sensing elements.

2. Description of the Prior Art

The solid state image pickup devices having light-to-charge converting 3 charge-accumulating portions and charge transfer portions, for example, charge coupled device (CCD) and bucket bridge device (BBD) have their resolving power for the object image formed on the one-dimensional or two-dimensional sensing surface depending upon the number of light receiving elements constituting a unity of image sensing line or area. To achieve an increase in the apparent resolving power with a limited number of light receiving elements, there is known, among others, a method of interpolating the outputs of the light receiving elements (resolution cells). For example, U.S. Pat. No. 4,148,059 discloses a device in which the interpolation of the outputs of the resolution cells is made by providing a memory for storing the outputs of the resolution cells a, delay means, a difference amplifier, an integrator and associated circuits as arranged outside the image sensor. These components are of large scale and, therefore, had the drawback that in actual practice it is very difficult to fabricate the image sensor and the interpolating means in one chip. This drawback becomes serious when the points of the image in the vertical direction are interrelated, because the number of delay means must be equal to the number of columns of resolution cells. Delay means and other associated means are very expensive and create an additional drawback in that the complexity of structure of the device is considerably increased.

SUMMARY OF THE INVENTION

It is an object of the present invention to provide a solid state image pickup element and a device employing the same which has overcome the above-described drawbacks of the conventional device.

Another object is to provide a solid state image pickup element of a reduced number of resolution cells and simplified structure while still permitting interpolation signals in the vertical direction for the television signal to be obtained.

Still another object is to provide a solid state image pickup element of a high degree of resolution and amenable to one-chip fabrication techniques.

According to an embodiment of the present invention, provided on a semiconductor substrate are a plurality of light receiving portions and transfer paths through which the electrical charges photo-electrically accumulated in the light receiving portions are successively transferred to the output. Further provided in the transfer paths are holding portions for holding each of a sequence of the charges for a period and control means for dividing the charge in the holding portion into parts which are then redistributed according to a prescribed scheme.

The signal for each of the light receiving portions (resolution cells) may be obtained and a signal for each of the zones centered in the spaces between the successively adjacent two resolution cells can be easily created.

This permits the possibility of a substantial increase in the degree of resolution of the image.

Another feature of the invention is the provision of a gate means which selectively transfers portions of the held charge at predetermined times to divide the charge in the aforesaid holding portion into parts which are then treated for addition, thus the charge dividing means can be constructed in a simple form.

Still another feature is that this gate means for dividing the charge takes its place in the charge transfer path, permitting the time-sequentially transferred charges to be processed for partition and redistribution.

These features enable the interpolation signals to be formed in the stage of charge so that the control means requires only to be supplied with pulses from the outside of the image sensing elements, thus making it easier to create the interpolation signals.

DESCRIPTION OF THE PREFERRED EMBODIMENTS

The present invention will next be described in greater detail by reference to the drawings. The present invention is applicable to all types of sensors including one-dimensional or line sensors and two-dimensional or area sensors.

Figure 1:
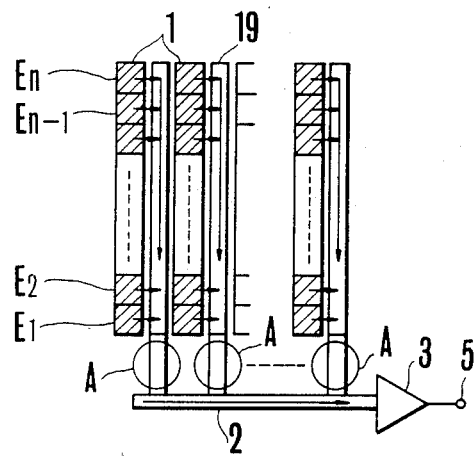
FIG. 1 is a schematic view illustrating an embodiment of a solid state image pickup element according to the present invention.

FIG. 1 in a schematic view illustrates an embodiment of a solid state image pickup element according to the present invention, as an example, an inter line transfer type CCD is used for the image sensing elements. This may be the frame transfer type CCD. Even if so, the discussion to follow is valid.

Figure 2:
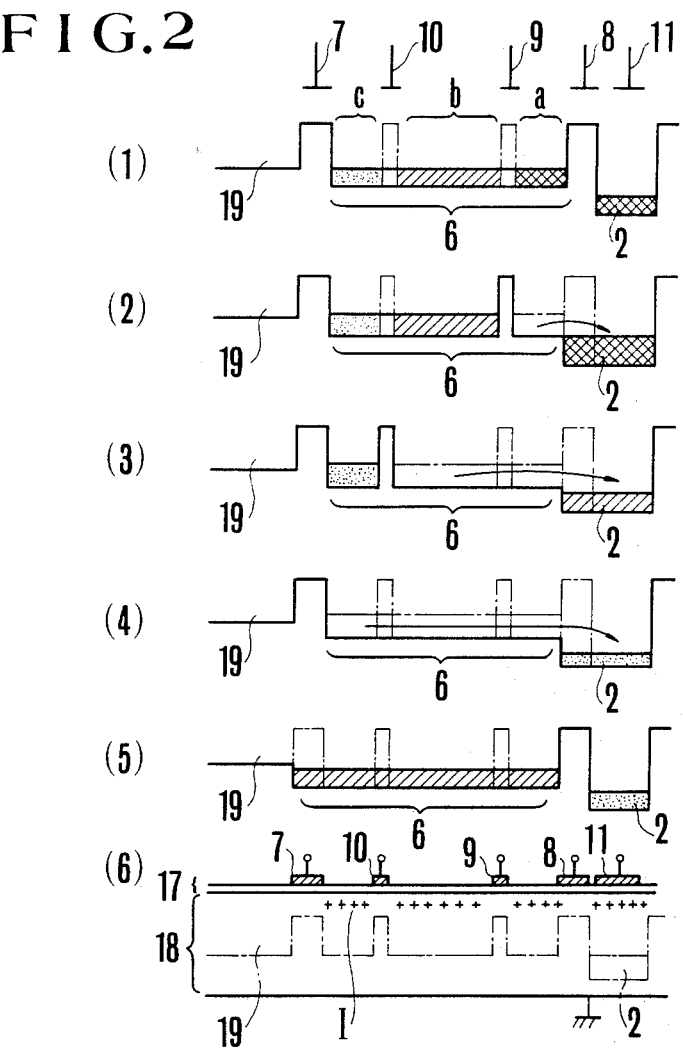
FIG. 2 is schematic sectional views illustrating the structure of the essential part of the element of FIG. 1 with formation of potential wells.

FIG. 2 schematically illustrates potential change in the essential part of the element of FIG. 1 and the cross-sectional structure of that part. In FIG. 1, 1 denotes photoelectric transducer portions (called resolution cells). Electrical charge information generated in each resolution cell is shifted to a corresponding address of vertical shift registers (19) of CCD structure as the transfer paths. Notice that this register (19) corresponds to the vertical scanning direction for the television signal, and that with the use of a continuous train of pulses, Vp, supplied to all the shift registers (19) simultaneously, the charges in the various stages of each shift register (19) are successively transferred to a horizontal shift register (2). Notice that the register corresponds to the horizontal scanning line for the television signal, and that the outputs of the vertical shift registers (19) are connected to the respective stage of the horizontal shift register (2).

After the charge information generated in the resolution cells has all been dumped into the respective addresses of the vertical shift registers (19) once, when the aforesaid transfer pulse Φv is supplied, those of the charge information which has been given off from the lowermost row of resolution cells, E1 in the matrix array of FIG. 1, is first dumped into the respective addresses of the horizontal shift register (12). Then, the register (2) is driven so that the charge information in the register (2) is successively transferred through an output amplifier (3) to a video output terminal 5. In the time interval between the successive two downward shift transitions along a vertical shift registers (19), the horizontal sequence of charges equal in number to the columns can be produced at the output terminal 5, therefore it is possible to scan the entire area of the matrix array of resolution cells in the period necessary for all the rows, E1 to En to be depleted. This period is in synchronous with the television signal.

The present invention provides for two-dimensional image sensors having a plurality of vertical transfer paths through the information of each column of resolution cells is transferred and a single horizontal transfer path through which the information of each row of resolution cells is transferred with holding portions for holding the charge information from the vertical transfer paths for a period and with gate means for allowing each of the charge informations in the holding portions to be dumped in a plurality of portions in sequence. Therefore even if the number of resolution cells is the same as in the prior art, the degree of resolution in the vertical lines can be substantially improved.

The holding portions of the invention are arranged at points in positions enclosed within circles A in FIG. 1 and constructed in such a form, as illustrated in FIG. 2, to produce a great advantage.

In more detail, the FIG. 1 illustrative embodiment of the invention has a signal charge holding portion (6) (see FIG. 2) provided between each of the vertical shift registers 19 and the horizontal shift register 2. Referring to FIG. 2(6), there is a gate electrode (7) for transferring the signal charge from the register (19) to the holding portion (6), another gate electrode (8) for transferring fractions of the signal charge from the holding portion (6) to the horizontal shift register 2, and additional gate electrodes (9 and 10) as dividing means for forming potential barriers at two points in the holding portion (6). In the illustrative embodiment, the potential barriers divide the signal charge storing space into three parts, a, b and c, at a ratio of 1:2:1 in area. A transfer electrode for the horizontal shift register (2) is indicated at 11. Further, 18 is a substrate for example, silicon and 17 is an insulating layer, for example, silicon dioxide. Examples of the electrode composition are aluminium and polysilicon. The aforesaid silicon substrate (18) is implanted with ions, I, such as phosphoric (P+) or arsenic (As+) by ion implantation.

The silicon substrate (18) has potential wells intrinsically formed therein, as illustrated in FIG. 2(6). Upon application of a bias, for example, a plus potential, to each electrode, and the barrier under that electrode between the potential wells is removed.

A method of operating the image pickup element of the invention by a clock driver, CD of FIG. 4, as a control means of the invention will next be explained by reference to the pulse timing chart of FIG. 3.

Figure 3:
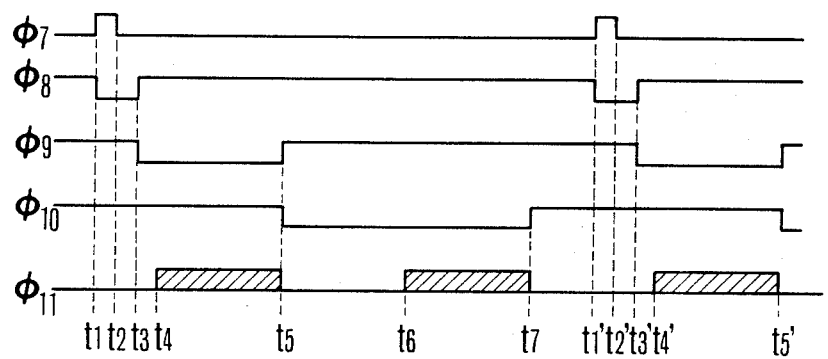
FIG. 3 is a timing chart of the output of a control circuit.

In FIG. 3, Φ7–Φ11 represent pulse trains applied to electrodes 7 to 11 respectively. Each time interval indicated by hatched lines, for the pulse Φ11 represents a period during which a number of shift pulses, equal to the number of resolution cells in each row, occur.

It is to be noted in connection with this embodiment that all the pulses Φ7 to Φ10 are formed to have equal periods to one another with different duty ratios from each other, and that Φ11 represents a train of groups of pulses with the intervals between the successive two groups being constant.

At a time $t_1$, gates 7, 9 and 10 are opened and gate 8 is closed, thereby allowing the charges for one row of resolution cells in the matrix array, for example, row E1, to be dumped into the respective holding portions (6) (FIG. 2(5)). At a time $t_2$, while gate 8 remains closed, and gates 9 and 10 are open, gate 7 is closed to hold the charge uniformly over the entire area of the holding portion (6) (FIG. 2(1)).

At a time $t_3$, the gate 9 is closed, and the gate 8 is opened, allowing that part of the charge which lies in the space, a, to move into the horizontal shift register (2) (FIG. 2(2)).

After that, during a period from a time $t_4$ to $t_5$, the horizontal shift register (2) is driven by the signal Φ11 to read out a sequence of signals for one horizontal scan line.

Then, at the time $t_5$, while gate 8 remains open, gate 10 is closed and gate 9 is opened, allowing that part of the charge which lies in the space, b, to move into the empty horizontal register (2) (FIG. 2(3)).

During a period from a time $t_6$ to a time $t_7$, information representing the points of the image in row E1 of the resolution cells are read out by the signal Φ11 in the form of ½ of the charge generated in each resolution cell in row E1.

Then at a time $t_1'$, gate 10 is opened, allowing the last or remaining part, c, of the charge to move to the corresponding stage of the empty horizontal shift register (2) (FIG. 2(4)).

From a time $t_1'$ to a time $t_2'$, the charge information for a new or second row of resolution cells E2 is dumped into the holding portions (6) in a similar manner to that described in connection with the preceding cycle. From the time $t_2'$ to a time $t_3'$, these charges are held. Further, from the time $t_3'$ to a time $t_4'$, one part, a, of the charge for this new row of resolution cells is added with the parts, c, of the charges for the row E1 of resolution cells which have been stored from the time $t_7$ to the time $t_1'$. From the time $t_4^1$ to a time $t_5'$, these added charge informations are read out as interpolation signals for the rows E1 and E2 of resolution cells.

Thus, for every one resolution cell shift of the vertical shift registers, the horizontal shift register is twice read out, this makes it possible to obtain about 2 times the degree of resolution in the vertical lines.

Figure 4:
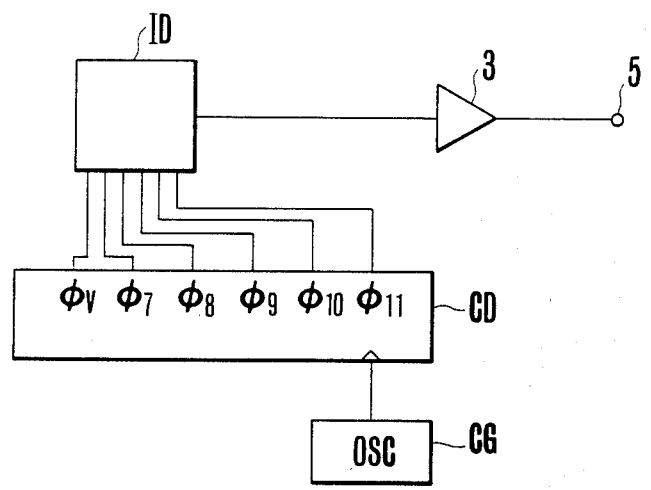
FIG. 4 is a block diagram of an embodiment of a solid state image pickup device according to the present invention.

FIG. 4 is a block diagram illustrating an example of an image pickup device using the element of the invention. In the drawing, ID denotes the image pickup element as illustrated in FIG. 2, and CD is a clock driver as a control means. The clock driver receives a clock pulse train from an oscillator CG for producing trains of pulses Φ7 to Φ11 and a train of vertical shift pulses Φv as illustrated in FIG. 3. The same reference characters have been employed to denote the similar parts to those shown in FIG. 1.

As has been described in greater detail above, the present invention provides a solid state image pickup element with charge holding portions, each capable of holding the charge for each resolution cell, and with control means for dividing this charge held in the holding portion into two part which are added with the corresponding parts of the preceding and following charges for the adjacent resolution cells, thereby interpolated outputs for the zones between the adjacent resolution cells can be obtained. This creates the possibility of heightening the pseudo-resolving power of the image pickup element without the use of a complicated circuit structure as in the prior art. It is also possible to fabricate such additional means of the invention as a unit with the image sensing elements in a single chip and, therefore, to minimize the bulk and size of an image pickup device using the same. Thus, the present invention has a great advantage at advance in reducing the size and weight of the device.

What is claimed is:

1. A solid state image pickup device comprising:
   (a) a plurality of light receiving means having light-to-charge converting ability;
   (b) a plurality of vertical transfer paths for shifting electrical information generated in said light receiving means to a direction corresponding to the vertical scan line for a television signal;
   (c) a plurality of holding means for holding each one of a sequence of information from the respective vertical transfer paths for a predetermined period;
   (d) control means for controlling the operation of said holding means so that at least part of the information held by said holding means is dumped to the output a plurality of times during said predetermined period; and
   wherein said holding means includes gate means for dividing the held information into parts which are produced at the output thereof.

2. A solid state image pickup device according to claim 1, further including a horizontal transfer path for shifting the output information from said holding means to a direction corresponding to the horizontal scan line for the television signal.

3. A solid state image pickup device according to claim 2, wherein said horizontal transfer path includes a charge coupled device.

4. A solid state image pickup device according to claim 2, wherein said horizontal transfer path has input addresses connected to the corresponding outputs of said holding means.

5. A solid state image pickup device according to claim 4, wherein said horizontal transfer path is read out twice within the period of one cycle of holding operation by said holding means.

6. A solid state image pickup device according to claim 4, wherein at least part of the output of said holding means is subjected to addition in the corresponding address of said horizontal transfer path.

7. A solid state image pickup device according to claim 1, wherein said light receiving means each generates an amount of electrical charge in accordance with light received thereby.

8. A solid state image pickup device according to claim 1, wherein said vertical transfer paths include charge coupled devices.

9. A solid state image pickup device according to claim 1, wherein said control means operates in such a manner that within the holding period of the information in said holding means, said information is produced three times.

10. A solid state image pickup device comprising:
    (a) a plurality of light receiving means having light-to-charge converting ability;
    (b) a plurality of vertical transfer paths for shifting electrical information generated in said light receiving means to a direction corresponding to the vertical scan line for a television signal;
    (c) a plurality of holding means for holding each one of a sequence of information from the respective vertical transfer paths for a predetermined period; and
    (d) control means for controlling the operation of said holding means so that at least part of the information held by said holding means is dumped to the output a plurality of times during said predetermined period;
    further including a horizontal transfer path for shifting the output information from said holding means to a direction corresponding to the horizontal scan line for the television signal;
    wherein said control means operates in such a manner that within the holding period of the information in said holding means, said information is produced three times and wherein said horizontal transfer path has input addresses connected to the corresponding outputs of said holding means.

11. A solid state image pickup device according to claim 10, wherein said light receiving means each generates an amount of electrical charge in accordance with light received thereby.

12. A solid state image pickup device according to claim 10, wherein said vertical transfer paths include charge coupled devices.

13. A solid state image pickup device according to claim 10, wherein said horizontal transfer path includes a charge coupled device.

14. A solid state image pickup device according to claim 10, wherein said holding means includes gate means for dividing the held information into parts which are produced at the output thereof.

15. A solid state image pickup device according to claim 10, wherein said horizontal transfer path is read out twice within the period of one cycle of holding operation by said holding means.

16. A solid state image pickup device according to claim 10, wherein at least part of the output of said holding means is subjected to addition in the corresponding address of said horizontal transfer path.

17. A solid state image pickup device comprising:
    (a) light receiving means composed of a plurality of picture elements arranged in row and column and having photoelectric converting ability;
    (b) read-out means for reading out an electrical information produced by each of the picture elements in the column direction;
    (c) means for dividing into three parts the electrical information produced by each of the picture elements, said splitting means being arranged in said read-out means; and
    (d) control means for controlling said read-out means so as to read out at least part of said three-part-divided electrical information at different times according to vertical scanning.

18. A solid state image pickup device according to claim 17, further comprising operation means for operating at least part of the three-part-divided electrical signals with another electrical information.

19. A solid state image pickup device according to claim 17, in which said dividing means divides each of the electrical information at a rate of 1:2:1.

* * * * *